United States Patent Office 3,430,607
Patented Mar. 4, 1969

3,430,607
METHOD OF GROWING OYSTERS BY USING A PARTICULATE GYPSUM OYSTER BED COVERING
Earl R. Derouen, Little Rock, Ark., assignor to Olin Mathieson Chemical Corporation, New Haven, Conn., a corporation of Virginia
No Drawing. Filed Mar. 2, 1967, Ser. No. 619,931
U.S. Cl. 119—4                                             6 Claims
Int. Cl. A01k 61/00

ABSTRACT OF THE DISCLOSURE

Oyster beds are extended and new beds are built by distributing gypsum on the bottom of a body of water adapted to the growth of oysters. The gypsum used is the by-product gypsum produced in the manufacture of phosphate products by the acidulation of phosphate rock with sulfuric acid.

---

This invention relates to an improved method for cultivating oysters. More particularly, it relates to the use of waste gypsum in the construction of beds and reefs to encourage the growth of oysters.

Oysters grow principally in brackish water of bays and estuaries where the fresh water of rivers and streams mixes with the salt water of the ocean. Under favorable conditions, reefs are formed by the growth of a crust of living oysters on bed of old shells. The reef affords some protection of the oysters from crabs, conch and other natural predators and from silt deposited by the rivers. The location and direction of growth of oyster reefs depends on the direction of water currents which carry food and on the nature of the bottom. Soft mud bottoms limit growth but clay and gravel encourage growth. Reefs can be encouraged to grow in preferred directions and new reefs can be started in locations which may be privately owned, advantageous for feeding and harvesting and where natural predators can be controlled. To provide a bed for artificial reefs, oyster shell, car bodies, rock, slag or crushed limestone have been used. For example, U.S. Patent 1,921,945 describes the use of blast furnace slag for oyster culture. However, with improvements in steel manufacture, the supply of this material is diminishing and transportation is expensive from locations far removed from the location of oyster beds. The supply of dead oyster shells is rapidly diminishing and old beds are increasingly difficult to locate. Also, the locations of old beds are ever more remote from the desired location of use to promote new beds. The cost of dredging and transportation is rapidly becoming prohibitive. The cost of mining, crushing and transporting limestone limits the use of this material. Car bodies and waste metals of other kinds have been used but they eventually rust away and, in addition to cost, are not permanent. Fabricated articles, for example, racks, trays or other support means submerged in desirable locations for oyster beds are also too expensive. For the above reasons, there is a great need for a cheap supply of suitable material for extending existing oyster beds and for building new beds in advantageous locations since the demand for oysters of good quality and size, grown in non-polluted waters is always increasing.

One object of this invention is to provide improved and advantageous means for building and extending oyster beds. More particularly, an object of this invention is to provide a cheap and effective material for this purpose which is usually available at locations near point of use, is cheaply handled and transported and is surprisingly effective for this purpose. Other and further objects of this invention appear in the following description.

The material provided by this invention for use in building and extending oyster beds is the gypsum produced as a by-product of the manufacture of phosphoric acid, fertilizers and other phosphate products from phosphate rock. According to this invention, this gypsum is dumped in suitable locations to form beds for the growth of oysters. This waste gypsum is cheaply available in vast quantities. It is frequently produced and located near the places where its use is advantageous. The physical form of the gypsum has a special advantage in being finely divided as produced but setting in salt or brackish water to form hard rock. Seed oysters readily attach to the hardened gypsum. Their growth is stimulated in some peculiar and unexplained manner by the gypsum and/or minor components therein as compared with car bodies or other artificial bedding materials. It is believed that some gamma radiation in the gypsum has a salutory effect on the growth of oysters.

The gypsum useful for the process of this invention is produced in tremendous quantities as a by-product in the manufacture of phosphoric acid and phosphate products based thereon. Phosphate rock is usually first acidulated by digestion with aqueous sulfuric acid. The calcium phosphate of the rock is converted to phosphoric acid and calcium sulfate dihydrate or gypsum, which is separated usually by filtration. The gypsum cake is washed thoroughly to recover all the phosphoric acid in the aqueous filtrate. The precipitated gypsum is finely divided, for example, screen analysis of a typical material shows 18% on 200 mesh and 80% through 325 mesh. However, the particular fineness is not critical but merely advantageous. The cake is slurried with water and pumped to waste storage where the water drains away. The resulting mountains of gypsum are a feature of a fertilizer plant and cover many acres of land which are removed from profitable use. Any further disposal of the gypsum in a non-polluting manner has not been found economically feasible. It is a particular advantage of this invention that it provides an elegant solution of this disposal problem.

In the practice of the process of this invention, the by-product gypsum is readily picked up by clam shell devices or any other convenient machine and loaded into transportation equipment, most advantageously into barges or scows. Usually water transportation means are cheapest and are readily available to most fertilizer plants but other forms of transportation are suitable, including rail cars and trucks. Bottom-drop scows are particularly advantageous and most economical. One transfer from land to scow and one unloading at the surface of the body of water above the selected location are frequently all the handling required. This procedure makes the process of this invention most economical. However, the load is also suitably, in some circumstances, distributed as desired. Thus, specific amounts are appropriately unloaded by spreading in a particular area which is advantageous in building or extending oyster beds of any desired shape or size. On firm bottoms a bed of two to six inches thick of gypsum is sufficient but on soft bottoms as much as 18 inches may be desirable.

The weight of the by-product gypsum is about one ton per cubic yard and it sinks very rapidly forming an oyster bed quickly. It does not tend to float or wash away in water currents.

A further peculiar advantage of the gypsum by-product of fertilizer manufacture is that in salt water it hardens rapidly and forms a firm bottom. However, it is not so rigid as to damage oyster harvesting equipment which is advantageous compared to crushed limestone, slag or car bodies. The bottom formed by the by-product gypsum is especially advantageous in providing a rough surface suitable for attachment by oyster spat. The bed formed by the gypsum is seeded naturally by oyster spat floating to the location from pre-existing adjacent oyster beds or is inoculated artificially. The gypsum bed favors the rapid development of healthy oyster beds and is a heretofore unknown advantage of the gypsum used according to this invention.

Example

Ten thousand tons of gypsum produced as a by-product of fertilizer manufacture were transferred by clam shell to bottom drop scows in the Houston ship canal. The loads were towed to Galveston Bay and unloaded near Eagle Point. The gypsum covered an area of 10 acres to an average depth of 6 inches. After settling and hardening for 60 days, the bed was seeded in the fall of one year with 100 bushels of seed oysters. In the fall of the third following year, 10,000 bushels of oysters were harvested. They were of commercial size and quality and averaged 4 inches in length.

From the foregoing, it is apparent that the object of this invention have been achieved with all the unexpected advantages as described.

What is claimed is:

1. In a method of growing oysters, the improvement of distributing particulate gypsum on the bottom of a body of water adapted to the growth of oysters to form a bed, said gypsum produced by acidulating phosphate rock with sulfuric acid in the manufacture of phosphate products.

2. The improvement as claimed in claim 1 in which said gypsum is distributed on said bottom to a thickness of from 2 to 18 inches.

3. The improvement as claimed in claim 1 in which said body of water is brackish.

4. The improvement as claimed in claim 1 in which said gypsum is washed with water in the manufacture of phosphate products.

5. The improvement as claimed in claim 1 in which said gypsum is distributed by unloading at the surface of said body of water and settling to said bottom.

6. The improvement as claimed in claim 1 in which said bed is seeded with oyster spat.

References Cited

UNITED STATES PATENTS

| | | | |
|---|---|---|---|
| 1,921,945 | 8/1933 | Robertson | 119—4 |
| 2,181,882 | 12/1939 | Flower | 119—4 |
| 2,319,170 | 5/1943 | Toner | 119—4 |
| 2,922,393 | 1/1960 | Munz | 119—4 |
| 3,298,354 | 1/1967 | Geer | 119—4 |

ALDRICH F. MEDBERY, *Primary Examiner.*